March 9, 1965    A. M. MULLER    3,172,950
POSITION CONTROL SYSTEM
Filed Feb. 14, 1963
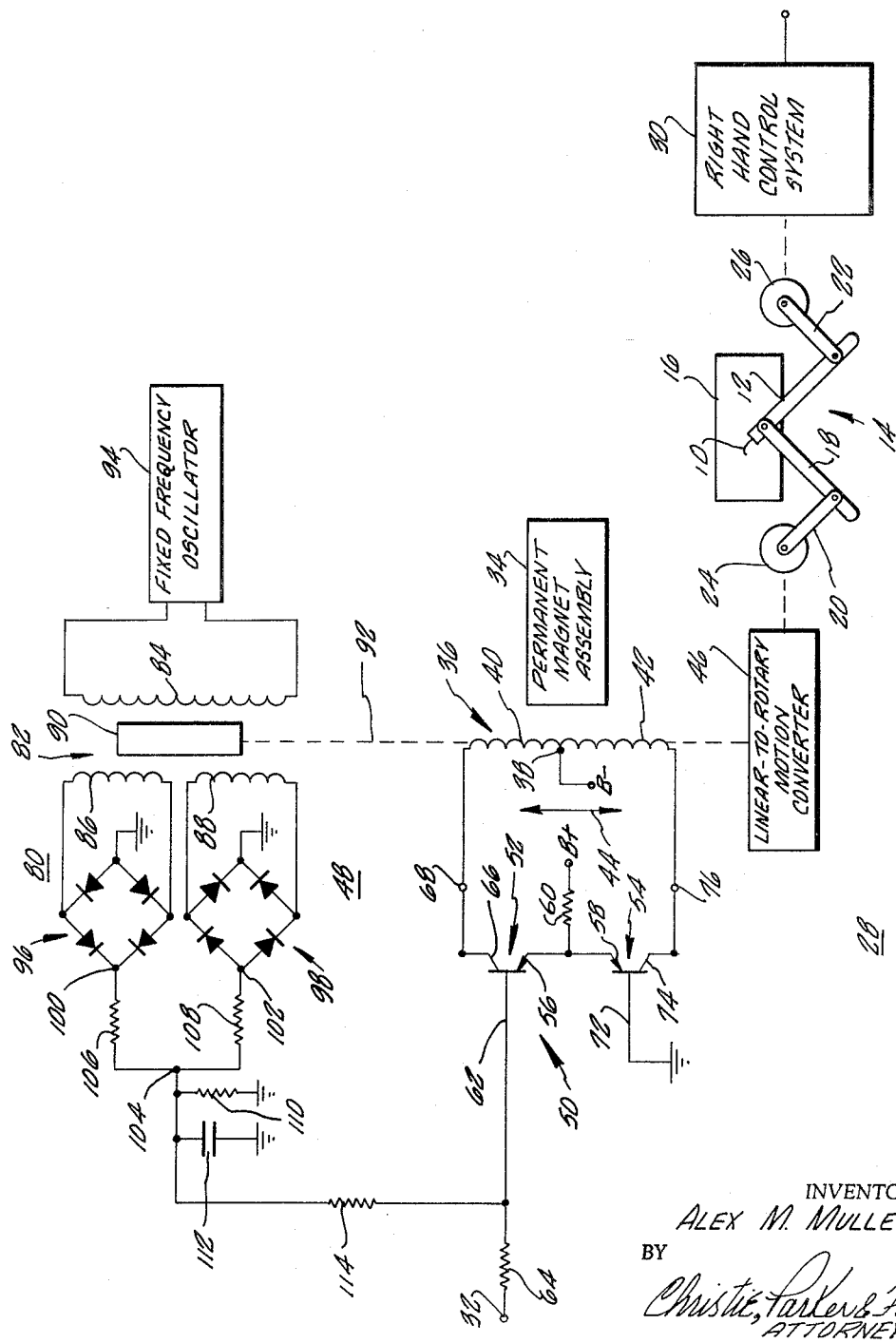
INVENTOR.
ALEX M. MULLER
BY
Christie, Parker & Hale
ATTORNEYS.

United States Patent Office 3,172,950
Patented Mar. 9, 1965

3,172,950
POSITION CONTROL SYSTEM
Alex M. Muller, Inglewood, Calif., assignor to Telautograph Corporation, Los Angeles, Calif., a corporation of California
Filed Feb. 14, 1963, Ser. No. 258,804
11 Claims. (Cl. 178—19)

The present invention relates to improvements in position control systems and more particularly to a novel closed loop servo system which is particularly adaptable to telescriber systems and the like.

In telescriber systems, it is desired to accurately reproduce written messages at a remote receiver location in response to hand controlled movements of a writing element at a transmitter location. To accomplish this, the movements of the writing element are converted into electrical signals. Electrical signals vary as a function of the position of the writing element to provide an electrical signal representation of the position of the writing element. The electrical signals are transmitted to the remote receiving location. At the receiver location the electrical signals are applied to an electromechanical control apparatus coupled to a movable writing element. The electrical signals energize the control apparatus to cause the writing element to follow the movements of the writing element at the transmitter location to reproduce the written message.

In order that the reproduced message accurately corresponds to the original message as written, the control apparatus must be capable of rapidly responding to both small and large variations in the electrical signals applied thereto. In addition, such response should be as linear as possible.

In the past, the control apparatus employed in telescriber systems have proven somewhat unsatisfactory in providing the positioning control necessary to reproduce written messages with a high degree of accuracy.

In view of the above, the present invention provides an improved, highly linear, control apparatus which is particularly adaptable to telescriber systems. The control apparatus, in a telescriber system, accurately controls the movement and position of a writing element to reliably and rapidly follow changes in a positioning input signal.

Briefly, to accomplish this, the present invention employs a movable center tapped coil arrangement positioned in a substantially uniform magnetic field. The voice coil is coupled to a circuit means receiving a control signal for developing opposing inversely variable current in branches of the coil defined by the center tap. The opposing currents produce opposing inversely variable forces on the coil such that the movement and position of the coil within the magnetic field is controlled by changes in the value of the control signal relative to a predetermined reference value. The coil is coupled to means for moving a movable member, such as a writing element, in response to movement of the coil. Also coupled to the coil are means for generating a feedback signal substantially proportional to the position of the coil relative to a reference position. Preferably, the means for generating the feedback signal includes means for developing first and second opposing signals together with means coupled to the coil assembly for inversely varying the magnitude of the signals as a function of the position of the coil assembly relative to a reference position. The first and second signals are combined to develop the feedback signal. The feedback signal thus formed, is combined with an input signal which is a function of the desired position of the movable member to develop the desired control signal.

Thus, the control apparatus of the present invention includes a closed loop servo having a movable coil assembly operatively associated with the means for moving the movable member as well as the means for generating the feedback signal for the closed loop.

By generating opposing inversely variable forces on the movable coil assembly, the closed loop servo arrangement provides a positive power control over the movable member which is highly linear and rapidly responsive to small changes in the control signal applied thereto.

The above, as well as other features of the present invention, may be more clearly understood by reference to the following detailed description when considered with the drawing, the single figure of which is a schematic block-diagram representation of a preferred form of the present invention as employed in a telescriber receiver.

As illustrated, the telescriber receiver includes a writing element 10. The writing element is coupled to a movable arm 12 of a W linkage arrangement 14 for controlling the movement of the writing element 10 over a writing surface illustrated at 16. The linkage arrangement 14 is of conventional design and, in addition to the movable arm 12, includes movable arms 18, 20 and 22. The arms 18 and 20 are pivotally coupled to each other and are coupled between a rotary drive element 24 and the arm 12, the arm 18 being coupled to the arm 12 and the arm 20 being coupled to the rotary member 24. Similarly, the arms 12 and 22 are pivotally coupled to each other and to a rotary drive element 26.

Rotary movement of the rotary drive elements 24 and 26 impart selectively controllable motion to the writing element to position the element at any point on the writing surface 16. The rotary motion of the members 24 and 26 is under control of a pair of position control systems 28 and 30. The position control systems 28 and 30 are substantially the same. Therefore, only the system 28 is illustrated in detail.

Briefly, the control system 28 is arranged to impart selective positioning movement to the member 24 and hence the writing element 10 in response to a positioning input signal applied to an input terminal 32. Preferably, the positioning input signal is a D.-C. signal having a magnitude proportional to the desired rotary position of the member 24.

To provide selective control over the rotary position of the element 24 which is both extremely rapid and highly linear, the control system of the present invention includes means for developing a substantially uniform magnetic field represented in block form by the permanent magnet assembly 34. Positioned within the magnetic field is a moving coil 36. Preferably, the coil 36 is wound relative to the means for generating the magnetic field such that the windings of the coil are substantially normal to the magnetic field. As illustrated, the moving coil 36 is center tapped at 38 and coupled to a source of reference potential illustrated as B—. Thus, current signals flowing to B— through upper and lower branches 40 and 42 of the coil 36 are substantially normal to the magnetic field and develop opposing forces on the coil 36. When the currents are equal the forces are equal and a balanced force condition exists.

The moving coil 36 is mounted (by means not specifically shown) for straight line movement within the magnetic field in directions illustrated by the double-ended arrow 44. Therefore, when the currents in the moving coil 36 are equal, the forces on the coil are balanced and the coil assumes a reference position within the magnetic field. When one of the currents exceeds the other, however, an unbalancing of the forces occurs and the coil moves freely within the magnetic field to a new position.

Such linear movement of the moving coil 36 imparts rotary movement to the member 24 through a linear-to-rotary motion converter represented at 46. The converter 46 is coupled both to the coil 36 and to the member 24 and may comprise a cable assembly coupled around a rotatable drum. Preferably, the moving coil and associated magnet assembly and the linear-to-rotary motion converter are of a type described in detail in the co-pending patent application, Serial No. 258,589, filed February 14, 1963, and assigned to the same assignee as the present invention.

To impart selective movement to the moving coil 36 in response to the positioning input signal applied to the input terminal 32, circuit means 48 is coupled to the coil 36 for developing a control signal. Briefly, the circuit means 48 is arranged to develop opposing inversely variable current signals in the upper and lower portions 40 and 42, respectively, of the coil 36. The current signals, in passing through the portions 40 and 42 and through the magnetic field, produce opposing inversely variable forces on the moving coil 36. The current signals are hence the opposing forces are equal and balance each other when the control signal is of a predetermined value. Variations in the control signal from the predetermined value, however, inversely vary the current signals and the forces to develop a resultant force on the coil proportional to the change in the control signal from its predetermined value. The coil moves within the magnetic field in response to the control signal to a position defined by the magnitude of the control signal relative to its predetermined value. In this manner the position and movement of the moving coil 36 and hence the rotary movement of the member 24 is directly controlled by the control signal developed in the circuit means 48.

More particularly, the circuit means 48 includes a differential amplifier 50 having a push-pull output circuit arrangement coupled to the end terminals of the moving coil 36. The push-pull amplifier 50, by way of example only, comprises a pair of PNP type transistors 52 and 54 having their emitter terminals 56 and 58 respectively, coupled in common through a biasing resistor 60 to a source of positive potential presented as B+. The transistor 52 includes a base terminal 62 coupled through a resistor 64 to the input terminal 32 and a collector terminal 66 coupled to an output terminal 68. Similarly, the transistor 54 includes a base terminal 72 coupled to receive a reference signal represented as ground and a collector terminal 74 coupled to an output terminal 76. The output terminals 68 and 76 are coupled to the end terminals of the coil associated with the portions 40 and 42, respectively. By proper proportioning of the value of the potential sources B+ and B— and the bias resistor 60 associated therewith, the transistors 52 and 54 are normally biased to a conductive state and pass current signals through the associated windings 40 and 42 to B—.

The differential amplifier 50 is arranged to receive the control signal at the base terminal 62 of the transistor 52 and develop equal current signals at the output terminals 68 and 76 when the control signal is equal in value to the signal applied to the base terminal 72 of the transistor 54. This results in equal current flow through the portions 40 and 42 of the coil 36 which, in turn develop equal but opposed forces on the coil to maintain the coil 36 at its reference position within the magnetic field of the permanent magnet assembly 34.

Briefly, in operation, a change in the value of the control signal relative to the signal at the base terminal 72 immediately disturbs the balance of the amplifier 50. If the control signal applied to the base terminal 62 exceeds the reference signal applied to the base terminal 72, the drop in voltage occurs across the emitter-base junction of the transistor 52 to reduce the collector current flowing through the portion 40 of the moving coil 36. As the emitter-collector current of the transistor 52 decreases a like increase occurs in the emitter-collector current flowing in the transistor 54 and through the portion 42 of the moving coil 36. Thus, in response to a change in the value of the control signal relative to its predetermined value the magnitudes of the current signals flowing in the branches 40 and 42 of the coil 36 vary inversely. The opposing forces developed by currents flowing through the magnetic field no longer balance and a resultant force is developed on the voice coil 36 proportional to the value of the control signal relative to its predetermined value. The moving coil 36 moves in response to the unbalance of force to impart selective rotary movement to the member 24 through the converter 46.

As the coil moves to impart rotary movement to the member 46 the value of the control signal reduces to again produce a balance of forces on the coil 36 when the coil is in a desired position. To provide such a reduction of the control signal as well as to provide means for developing the control signal, feedback means 80 are coupled to the coil 36 to develop a feedback signal proportional to the position of the coil 36 relative to its reference position. The feedback signal is combined with the input positioning signal to develop the control signal which is proportional to a difference between the input positioning signal and the feedback signal. Thus, the amplifier 50 together with the movable coil 36 combines with the feedback means 80 to provide a closed loop servo arrangement for controlling the position of the coil in response to the input positioning signal and hence the control signal applied to the amplifier 50.

The closed loop servo arrangement thus described is characterized by providing a positive positioning control in opposite directions for the moving coil 36 and hence for the member 24 through the converter 46. Such positive drive control through the closed servo loop is rapidly responsive to small changes in the control signal and provides for highly linear movement of the coil 36.

Although many different apparatus for developing the necessary control signal may be utilized the preferred form of the present invention incorporates a particular feedback arrangement which increases the linearity and signal range of the over-all closed loop system comprising the present invention. Briefly, to accomplish this, the feedback means 80 is arranged to develop a pair of current signals. Normally the signals are of equal value and combine to produce a zero feedback signal. The feedback means 80, however, includes means for inversely varying the magnitude of the signals in response to movement of the coil from its reference position. The resultant feedback signal therefore varies as a function of the position of the coil 36 relative to its reference position.

In its preferred form the feedback means 80 includes a differential transformer 82 having a primary winding 84 and a pair of opposing secondary windings 86 and 88. The differential transformer 82 also includes a movable probe 90 of magnetic material positioned for longitudinal movement within the differential transformer to inversely vary the magnetic coupling between the primary winding 84 and the secondary windings 86 and 88, respectively.

The probe 90 is mechanically coupled to the movable coil 36 as represented by the dotted line 92 for linear movement therewith. When the coil 36 is in its reference position the probe 90 is as illustrated and provides substantially equal magnetic coupling between the primary winding 84 and the secondary windings 86 and 88. In response to a relative upward movement (in the drawing) of the coil 36, the magnetic coupling between the primary winding 84 and the secondary winding 86 increases while the magnetic coupling between the primary winding 84 and the secondary winding 88 decreases. The reverse is true for a relative downward movement of the coil 36.

A fixed frequency oscillator 94 applies a fixed frequency signal to the primary winding 84. Due to the opposing winding arrangement of the secondary windings 86 and 88, current flow in the primary winding 84 induces current signals in the secondary windings which are 180° out of phase. Thus, for example, a current signal is induced in the secondary winding 86 which is in phase with current flow in the primary winding 84 while an electrical signal is induced in the secondary winding 88 which is 180° out of phase with the current flow in the primary winding 84.

When the probe 90 is centrally positioned midway between the secondary windings 86 and 88, equal magnetic coupling exists between the primary winding 84 and the secondary windings. The current signals induced in the secondary windings are thus of equal magnitude. Movement of the probe 90, however, inversely varies the coupling between the primary and secondary windings to inversely amplitude modulate the electrical signals induced in the secondary windings.

To develop the opposing current signals which, when combined, produce the desired feedback signal, the secondary windings 86 and 88 are coupled to demodulator circuits 96 and 98, respectively. As illustrated, by way of example only, the demodulators comprise double balanced, ring diode demodulators.

As is well known in the art, ring demodulators function to develop a varying D.-C. signal at an output terminal which is directly proportional to the amplitude of an A.-C. signal applied across one diagonal of the ring, the remaining terminal of the ring being coupled to a source of reference biasing potential.

In the arrangement of the demodulators 96 and 98, the output terminals 100 and 102, respectively, are coupled to a common terminal 104 through resistors 106 and 108. The secondary winding 86 is coupled across a diagonal of the demodulator 96 while the secondary winding 88 is coupled across a similar diagonal of the demodulator. The remaining terminal of the demodulators 96 and 98, respectively, is coupled to a source of reference potential illustrated as ground. A common return path to ground is provided for the demodulators 96 and 98 by a resistor 110 coupled to the common terminal 104 while a smoothing or integrating of the feedback signal developed at the terminal 104 is provided by a capacitor 112 coupled between the terminal 104 and ground.

As illustrated, the diodes comprising the demodulator 98 are poled in an opposite direction relative to like diodes comprising the demodulator 96. It is to be appreciated that such an opposite poling arrangement provides for opposite current flow through the resistor 110 from the demodulators 96 and 98, respectively. Thus, the current signals produced by the demodulators are continuously subtracted in the resistor 110 to produce a resultant feedback signal at the terminal 104 which is proportional to a difference between the respective current signals.

When the coil 36 is in its reference position with the probe 90 providing equal coupling to the secondary windings 86 and 88, equal current signals are developed in the secondary windings. In such a state the current signal developed by demodulators 96 and 98 are of equal value and being of opposite direction produce a zero resultant feedback signal at the terminal 104. Movement of the probe 90 with the coil 36 to inversely vary the amplitude of the current signals in the secondary winding, however, results in an unbalancing of the current signals produced by the demodulators. A resultant feedback signal is thus developed at the terminal 104 having a magnitude and polarity proportional to the difference between the current signal produced by the demodulators. Thus, the feedback signal is proportional in magnitude to the displacement of the coil 36 from its reference position and in polarity to the direction of displacement of the coil 36.

The feedback signal thus developed passes through a resistor 114 to the base terminal of the transistor 52. At the base terminal 62 the feedback signal is combined with the input positioning signal applied to the input terminal 32 to develop the desired control signal which is proportional to the difference between the feedback signal and the input positioning signal.

In the feedback circuit arrangement employing the differential transformer 82, the double secondary winding arrangement allows the full stroke of the probe 90 from a reference central position to be utilized, thereby providing for a highly compact design.

The feedback circuit arrangement, in developing opposing signals to produce the resultant feedback signal, is also highly linear and rapidly responsive to small changes in position of the moving coil 36 as transmitted by variation in position of the probe 90.

Thus, in its over-all operation the position control system 28 is highly sensitive to small variations in the magnitude of the control signal from its reference value to provide reliable and accurate positioning and repositioning of the rotatable member 24.

When the operation of the control system 28 is combined with the like operation of the control system 30 complete positioning control is provided for the writing implement 10 to selectively follow input positioning signals applied to the respective systems.

What is claimed is:

1. Apparatus for controlling the position and movement of a movable member comprising:
    means for producing a stationary magnetic field; a movable coil assembly positioned for movement in the magnetic field;
    circuit means coupled to the coil assembly and receiving a control signal and applying the control signal to the coil assembly for developing a current in the coil having a direction and magnitude which is a function of the value of the control signal relative to a predetermined value;
    means coupled to the movable coil assembly for moving the movable member in response to movement of the coil assembly;
    feedback means coupled to the coil assembly for developing a feedback signal substantially proportional to the position of the coil assembly relative to a reference position;
    and means for combining the feedback signal with an input signal which is a function of the desired position of the movable member to develop the control signal.

2. Apparatus for controlling the position and movement of a movable member comprising:
    means for generating a substantially uniform stationary magnetic field; circuit means including a movable coil assembly positioned in the magnetic field and means for receiving a control signal and applying the control signal to the coil assembly for developing opposing currents in the coil assembly which are equal in value when the input control signal is of a predetermined value and which are inversely variable in response to changes in the value of the control signal from the predetermined value;
    feedback means coupled to the coil assembly for developing a feedback signal substantially proportional to the position of the coil assembly relative to a reference position;
    means for combining the feedback signal with an input signal proportional to the desired position of the movable member to develop the control signal;
    and means coupled to the movable coil assembly for moving the movable member in response to movement of the coil assembly.

3. Apparatus for controlling the position and movement of a movable member comprising:
    means for generating a substantially uniform magnetic field;
    circuit means including a movable coil positioned in the magnetic field and having a center tap coupled to a source of reference potential, the circuit means receiving a control signal, and being arranged to develop opposing inversely variable current signals in branches of the coil defined by the center tap such that opposing inversely variable forces are developed on the coil in response to changes in the control signal relative to a predetermined reference value;

means coupled to the coil for moving the movable member in response to movement of the coil;

feedback means coupled to the coil for developing a feedback signal substantially proportional to the position of the coil relative to a reference position;

and means for combining the feedback signal with an input signal substantially proportional to the desired position of the movable member to develop the control signal.

4. Apparatus for controlling the position and movement of a movable member comprising:

means for developing a magnetic field;

a center coil movable within the magnetic field and having a center tap coupled to a source of reference potential;

a differential amplifier receiving a control signal and a reference signal and having a push-pull output circuit coupled to the coil for developing opposing inversely variable current signals in portions of the coil defined by the center tap such that opposing inversely variable forces are developed on the coil in response to changes in the control signal relative to the reference signal;

means coupled to the coil for moving the movable member in response to movement of the coil;

feedback means coupled to the coil for developing a feedback signal substantially proportional to the position of the coil relative to a reference position;

and means for combining the feedback signal with an input signal which is a function of the desired position of the movable member to develop the control signal.

5. Apparatus for controlling the position and movement of a movable member comprising:

means for generating a stationary magnetic field; a movable coil assembly positioned in the magnetic field;

circuit means coupled to the coil assembly and receiving a control signal and applying the control signal to the coil assembly for developing a current in the coil having a direction and magnitude which is a function of the value of the control signal relative to a reference value;

means coupled to the movable coil assembly for moving the movable member in response to movement of the coil assembly;

means for developing first and second feedback signals;

means receiving the first atnd second feedback signals for developing a resultant feedback signal substantially proportional to a difference between the first and second feedback signals;

means coupled to the coil assembly for inversely varying the magnitude of the first and second feedback signals as a function of the position of the coil assembly relative to a reference position such that the resultant feedback signal is substantially proportional to the position of the coil assembly relative to the reference position;

and means for combining the resultant feedback signal with an input signal which is a function of the desired position of the movable member to develop the control signal.

6. Apparatus for controlling the position and movement of a movable member comprising:

means for generating a substantially uniform stationary magnetic field;

circuit means including a movable coil assembly for developing opposing currents in the coil assembly positioned for movement in the magnetic field and means for receiving a control signal and for applying the control signal to the coil assembly of equal value when the control signal is of a predetermined value and which are inversely variable in response changes in the control signal from the predetermined value;

means coupled to the movable coil assembly for moving the movable member in response to movement of the coil assembly;

means for developing first and second feedback signals;

means receiving the first and second feedback signal for developing a resultant feedback signal substantially proportional to a difference between the first and second feedback signals;

means coupled to the coil assembly for inversely varying the magnitude of the first and second feedback signals as a function of the position of the coil assembly such that the resultant feedback signal is substantially proportional to the position of the coil assembly relative to a reference position;

and means for combining the resultant feedback signal with an input signal which is a function of the desired position of the movable member to develop the control signal.

7. Apparatus for controlling the position and movement of a movable member comprising:

means for generating a magnetic field;

circuit means including a movable coil assembly positioned in the magnetic field and having a center tap coupled to a source of reference potential, said circuit means receiving a control signal and being arranged to develop opposing inversely variable current signals in branches of the coil defined by the center tap such that opposing inversely variable forces are developed on the coil in response to changes in the control signal relative to a reference value;

means coupled to the coil assembly for moving the movable member in response to movement of the coil assembly;

means for developing first and second opposing feedback signals;

means receiving the first and second feedback signal for developing a resultant feedback signal proportional to a difference between the first and second feedback signal;

means coupled to the coil assembly for inversely varying the magnitude of the first and second feedback signals as a function of the position of the coil assembly such that the resultant feedback signal is substantially proportional to the position of the coil assembly relative to a reference position;

and means for combining the resultant feedback signal with an input signal which is a function of the desired position of the movable member to develop the control signal.

8. Apparatus for controlling the position and movement of a movable member comprising:

means for generating a magnetic field;

circuit means including a movable coil position in the magnetic field and having a center tap coupled to a source of reference potential, said circuit means receiving a control and being arranged to develop opposing inversely variable current signals in branches of the coil defined by hte center tap such that opposing inversely variable forces are developed on the coil in response to changes in the control signal relative to a reference value;

means coupled to the movable coil assembly for moving the movable member in response to movement of the coil assembly;

a differential transformer having a primary winding, first and second secondary windings, and means coupled to the coil assembly for inversely varying the magnetic coupling between the primary winding and the first and second secondary windings, respectively, as a function of the position of the coil assembly relative to a reference position;

a constant frequency signal source coupled to the primary winding;

amplitude demodulator means having first and second inputs coupled to the first and second secondary windings, respectively, and arranged to develop a feedback signal proportional to a difference between the amplitude of electrical signals developed in the first and second secondary windings;

and means for combining the feedback signal with an input signal which is a function of the desired position of the movable member to develop the control signal.

9. In a telescriber system, apparatus for controlling the position and movement of a pen arm, comprising:

means for developing a magnetic field;

a movable coil assembly position within the magnetic field and having a center tap coupled to a source of reference potential;

a differential amplifier receiving a control signal and a reference signal and having a push-pull output circuit coupled to the coil assembly for developing opposing inversely varying current signals in adjacent portions of the coil defined by the center tap such that opposing inversely variable forces are developed on the coil assembly in response to changes in the control signal relative to the reference signal;

means coupled to the coil assembly for moving the pen arm in response to movement of the coil assembly;

a differential transformer having a primary winding, first and second secondary windings, and means coupled to the coil assembly for inversely varying the magnetic coupling between the primary winding and the first and second windings, respectively, as a function of the position of the coil assembly relative to a reference position;

a constant frequency signal source coupled to the primary winding;

amplitude demodulator means having first and second inputs coupled to the first and second secondary windings, respectively, and arranged to develop a feedback signal proportional to a difference between the amplitude of electrical signals developed in the first and second secondary winding;

and means for combining the feedback signal with an input signal which is a function of the desired pen are position to develop the control signal.

10. In a telescriber system, apparatus for controlling the position and movement of a pen arm, comprising:

means for generating a magnetic field; a movable coil assembly positioned in the magnetic field;

circuit means coupled to the coil assembly and receiving a control signal for developing a force on the coil having a direction and magnitude which is a function of the value of the control signal relative to a reference value such that changes in the control signal control the movement of the coil assembly;

means coupled to the movable coil assembly for moving the pen arm in response to movement of the coil assembly;

a differential transformer having a primary winding, first and second secondary winding, and means coupled to the coil assembly for inversely varying the magnetic coupling between the primary winding and the first and second secondary windings, respectively, as a function of the position of the coil assembly relative to a reference position;

a constant frequency signal source coupled to the primary winding;

first amplitude demodulating means coupled to the first secondary winding for developing a signal proportional to the amplitude of a signal developed in the first secondary winding;

a second amplitude demodulating means coupled to the second secondary winding for developing a signal proportional to the amplitude of a signal developed in the second secondary winding;

means for combining the output signals developed by the first and second amplitude demodulating means to produce a feedback signal proportional to a difference between the output signals;

and means for combining the feedback signal with an input signal which is a function of the desired pen arm position to develop the control signal.

11. Apparatus for controlling the position and movement of a movable member comprising:

means for generating a magnetic field;

a movable coil assembly positioned within the magnetic field and having a center tap coupled to a source of reference potential;

circuit means coupled to the coil assembly and receiving a control signal for developing opposing inversely variable current signals in branches of the coil assembly defined by the center tap such that opposing inversely variable forces are developed on the coil in response to changes in the control signal from a predetermined value;

means coupled to the coil assembly for moving the movable member in response to movement of the coil assembly;

and means for developing the control signal including means for developing first and second constant frequency signals, means coupled to the coil assembly for inversely modulating the amplitude of the first and second electrical signals as a function of the position of the coil assembly relative to a reference position, amplitude demodulator means receiving the first and second signals for developing a feedback signal substantially proportional to a difference between the amplitude of the first and second signals, means for receiving an input signal which is a function of the desired movable member position, and means for combining the feedback signal and the input signal to develop the control signal proportional to a difference between the input signal and the feedback signal.

References Cited in the file of this patent

UNITED STATES PATENTS

| | | |
|---|---|---|
| 2,931,963 | Wilson | Apr. 5, 1960 |
| 3,104,349 | Stevens | Sept. 17, 1963 |

UNITED STATES PATENT OFFICE
CERTIFICATE OF CORRECTION

Patent No. 3,172,950                         March 9, 1965

Alex M. Muller

It is hereby certified that error appears in the above numbered patent requiring correction and that the said Letters Patent should read as corrected below.

Column 7, line 71, beginning with "circuit means" strike out all to and including "equal value" in line 75, same column 7, and insert instead -- circuit means including a movable coil assembly positioned for movement in the magnetic field and means for receiving a control signal and for applying the control signal to the coil assembly for developing opposing currents in the coil assembly of equal value --.

Signed and sealed this 30th day of November 1965.

(SEAL)
Attest:

ERNEST W. SWIDER
Attesting Officer

EDWARD J. BRENNER
                                              Commissioner of Patents